US010886538B2

(12) United States Patent
Buvat et al.

(10) Patent No.: US 10,886,538 B2
(45) Date of Patent: Jan. 5, 2021

(54) METHOD FOR PREPARING PROTON-CONDUCTING PARTICLES SUITABLE FOR CATALYSING OXYGEN REDUCTION OR HYDROGEN OXIDATION BY GRAFTING SPECIFIC PROTON-CONDUCTING POLYMERS TO THE SURFACE OF SAME

(71) Applicant: COMMISSARIAT À L'ÉNERGIE ATOMIQUE ET AUX ÉNERGIES ALTERNATIVES, Paris (FR)

(72) Inventors: Pierrick Buvat, Montbazon (FR); Delphine Dru, Sorigny (FR); Cédric Loubat, Vendargues (FR); Quentin Crouzet, Octon (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 110 days.

(21) Appl. No.: 16/078,955

(22) PCT Filed: Feb. 24, 2017

(86) PCT No.: PCT/EP2017/054376
§ 371 (c)(1),
(2) Date: Aug. 22, 2018

(87) PCT Pub. No.: WO2017/144686
PCT Pub. Date: Aug. 31, 2017

(65) Prior Publication Data
US 2019/0097242 A1 Mar. 28, 2019

(30) Foreign Application Priority Data
Feb. 26, 2016 (FR) .................................. 16 51632

(51) Int. Cl.
H01M 4/90 (2006.01)
H01M 4/92 (2006.01)
C08F 12/30 (2006.01)
C08F 112/14 (2006.01)
B01J 23/42 (2006.01)
B01J 37/34 (2006.01)
B01J 37/16 (2006.01)
B01J 31/28 (2006.01)
B01J 37/00 (2006.01)
C08F 293/00 (2006.01)
B82Y 30/00 (2011.01)

(52) U.S. Cl.
CPC ........... *H01M 4/9008* (2013.01); *B01J 23/42* (2013.01); *B01J 31/28* (2013.01); *B01J 37/009* (2013.01); *B01J 37/16* (2013.01); *B01J 37/343* (2013.01); *C08F 12/30* (2013.01); *C08F 112/14* (2013.01); *C08F 293/005* (2013.01); *H01M 4/926* (2013.01); *B82Y 30/00* (2013.01); *C08F 2438/01* (2013.01)

(58) Field of Classification Search
CPC ...... H01M 4/9008; H01M 4/926; B01J 23/42; B01J 31/28; B01J 37/009; B01J 37/16; B01J 37/343; C08F 12/30; C08F 112/14; C08F 293/005
USPC ......................................................... 429/482
See application file for complete search history.

(56) References Cited

U.S. PATENT DOCUMENTS 4,797,505 A * 1/1989 Brown .................... A01N 37/40
558/244
2014/0309318 A1* 10/2014 Buvat ................. H01M 4/9008
521/31

FOREIGN PATENT DOCUMENTS

KR 100819065 B1 * 4/2008
WO 2013068319 A2 5/2013

OTHER PUBLICATIONS

Dru et al., Fluorine-Free Pt Nanocomposites for Three-Phase Interfaces in Fuel Cell Electrodes, Sep. 2016, ACS Catalysis, 6, 6993-7001 (Year: 2016).*
Liu et al., Control of the Electron Transfer Rate between Cytochrome c and Gold Electrodes by the Manipulation of the Electrode's Hydrogen Bonding Character, Feb. 2003, Langmuir, 19, 2378-2387 (Year: 2003).*
International Search Report for PCT/EP2017/054376 dated May 5, 2018.
Written Opinion for PCT/EP2017/054376 dated May 5, 2018.
French Search Report for French Application No. 1651632 dated Oct. 14, 2018.

* cited by examiner

*Primary Examiner* — Sean P Cullen
(74) *Attorney, Agent, or Firm* — Pearne & Gordon LLP

(57) ABSTRACT

A method for preparing particles comprising a material suitable for catalysing oxygen reduction or hydrogen oxidation, the particles being grafted by grafts consisting of at least one specific polymer comprising at least one repeating styrene unit bearing at least one proton-conducting group.

22 Claims, 1 Drawing Sheet

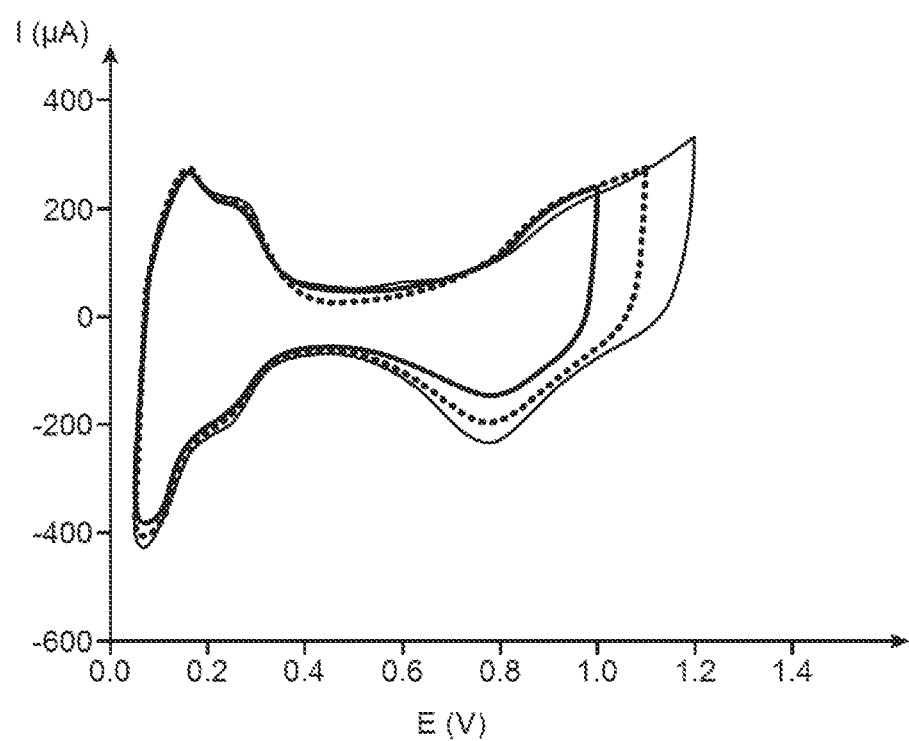
SINGLE FIGURE

METHOD FOR PREPARING PROTON-CONDUCTING PARTICLES SUITABLE FOR CATALYSING OXYGEN REDUCTION OR HYDROGEN OXIDATION BY GRAFTING SPECIFIC PROTON-CONDUCTING POLYMERS TO THE SURFACE OF SAME

CROSS-REFERENCE TO RELATED APPLICATIONS

This is a National Stage application of PCT international application PCT/EP2017/054376, filed on Feb. 24, 2017, which claims the priority of French Patent Application No. 16 51632, filed Feb. 26, 2016, both of which are incorporated herein by reference in its entirety.

TECHNICAL FIELD

The present invention pertains to a method for preparing particles able to catalyse oxygen reduction or hydrogen oxidation, these particles additionally being proton-conducting via functionalisation of said particles with specific organic proton-conducting polymers.

These particles have the characteristic of exhibiting catalytic activity (in particular for hydrogen oxidation or oxygen reduction) whilst having proton conductivity.

On this account, these particles find application in the preparation of electrode materials, in particular materials intended to enter into the composition of catalytic layers of electrodes for fuel cells, such as cells operating with $H_2$/air or $H_2/O_2$ (known as Proton Exchange Membrane Fuel Cells—PEMFCs).

The present invention therefore comes within the field of fuel cells operating along the principle of hydrogen oxidation and oxygen reduction.

STATE OF THE PRIOR ART

A fuel cell of this type is an electrochemical generator converting chemical energy to electrical energy by means of two electrochemical reactions: an oxidation reaction of a fuel (hydrogen) at the anode, combined with a reduction reaction of an oxidizer (air or oxygen) at the cathode.

Conventionally, this type of fuel cell comprises a plurality of electrochemical cells mounted in series, each cell comprising two electrodes of opposite polarity separated by a proton-exchange membrane acting as solid electrolyte, this membrane ensuring the movement towards the cathode of the protons formed by electrochemical reaction at the time of oxidation of the fuel at the anode.

The above-mentioned electrochemical reactions (oxidation and reduction) take place at specific areas of the electrodes (called active regions structurally corresponding to catalytic layers) forming the junction between the diffusion layer of the electrodes (at which the reactants are supplied) and the membrane, the occurrence of these reactions requiring the use of catalysts which, for fuel cells of PEMFC type, are conventionally platinum particles.

Having regard to the costs involved through the presence of a catalyst such as platinum, a maximum catalytic surface area must be obtained for a given mass of metal, said objective possibly being reached with platinum particles of nanometric size (also called platinum nanoparticles).

Additionally for electrochemical reactions to take place, the platinum particles must be in contact with the fuel or oxidizer (depending on anode or cathode positioning), with the constituent proton conductor of the membrane and also with the electronic conductor forming part of the electrode composition (this electronic conductor conventionally being a carbon material), this contact region being known as the triple point, and the electrode being all the more efficient the higher the number of triple points.

In other words, at these triple points in the region of the platinum particles, there is:
  physical continuity with the electrolytic membrane to ensure conduction of the $H^+$ protons;
  physical continuity with the electronic conductor to ensure conduction of the electrons; and
  physical continuity with the diffusion region of the electrodes to ensure the diffusion of gases (oxygen or hydrogen for PEMFC cells).

The maintaining of these triple points over time assumes heed of the integrity of these contact regions between the different elements entering into the composition of these triple points, which implies the maintaining of the physical integrity of these different elements and in particular of the platinum particles.

Yet, some studies have shown that it is possible when a fuel is in operation to observe degradation of the platinum particles (thereby inducing a reduction in the active surface) either via phenomena of dissolution or phenomena of increased platinum particle size (usually subsequent to agglomerating phenomena).

These dissolution phenomena can occur with cells operating at very low pH values (e.g. a pH lower than 1) and at high operating potentials at the cathode (e.g. a potential higher than 1 V versus RHE (reversible hydrogen electrode)), the dissolved platinum being found either in the water formed during functioning of the cell or inside the electrolytic membrane that is generally polymeric causing the formation therein of inactive platinum nanocrystals.

Regarding phenomena of size increase, these can occur ins cells with platinum nanoparticles having substantial mobility on the surface of the substrate generally in carbon, on which they are deposited, this mobility being dependent on the surface energy thereof.

To bypass these phenomena, recourse can be had to high levels of platinum content with the disadvantages that this represents in terms of production costs having regard to the very high market cost of platinum.

To reduce this content whilst having access to an efficient active surface area, studies have been conducted into the optimization of electrode-membrane assemblies, the electrodes comprising platinum particles.

For example, the juxtaposing in close contact of the different elements has been proposed (platinum particles, electronic conductor and electrolyte) that are needed to form the triple points, this juxtaposition possibly being obtained by:
  mixing platinum particles with carbon powder (acting as electrical conductor) and impregnating the whole with electrolyte to guarantee better contact with the membrane;
  depositing platinum particles via thin layer deposition (such as electrodeposition or physical sputtering), allowing the deposition of platinum in low concentrations whilst maintaining very high catalytic activity.

However, the assemblies resulting from these techniques are fragile on account of the weak bonds created to juxtapose the constituent elements of these assemblies, which does not prevent phenomena of degradation due to migration of the platinum particles thereby causing a reduction in the lifetime of these assemblies.

To overcome these shortcomings, the authors of the present invention proposed a method in WO 2013/068319 for preparing catalyst particles, more specifically in platinum covalently grafted with proton-conducting polymers via an organic residue of an organic, polymerisation-initiating compound of ATRP type, the specific grafts in this document being grafts of following formula (I'):

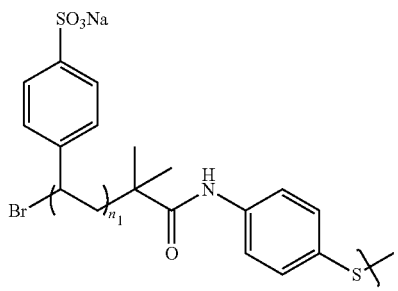

(I')

where $n_1$ corresponds to the number of repeats of the repeating unit between round brackets, the brace indicating the point via which said grafts are covalently bonded to the particles.

Starting from this method, the authors of the present invention set themselves the objective of further improving the above-mentioned method and to propose a novel method additionally allowing particles to be obtained which, once incorporated in a fuel cell, would allow improved electrochemical properties of the fuel cell to be obtained, such as open-circuit voltage, better activation of electrochemical reactions within the fuel cell, lesser ohmic drop and better delivered power.

The authors of the present invention have therefore found that by using a specific ATRP initiator in the method of the invention, it is possible to obtain particles having the above-mentioned properties.

DESCRIPTION OF THE INVENTION

The invention is therefore directed towards a method for preparing particles comprising a material able to catalyse oxygen reduction or hydrogen oxidation, said particles being grafted with grafts composed of at least one polymer comprising at least one styrene repeating unit carrying at least one proton-conducting group, said method comprising:

a) a step to prepare at least one styrene polymer via ATRP polymerisation of a styrene monomer with an ATRP initiator meeting following formula (I):

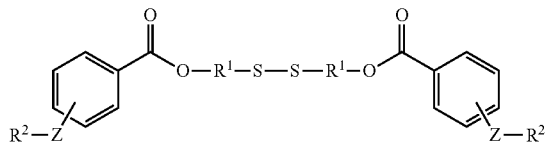

(I)

where:
the $R^1$ groups are each independently an organic spacer group;
the Z groups are each independently a single bond or an organic spacer group;
the $R^2$ groups are each independently a halogen atom;

the resulting polymer meeting following formula (II):

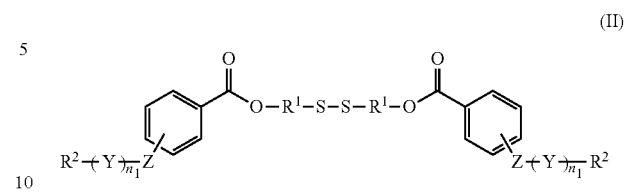

(II)

where Y corresponds to the styrene repeating unit carrying at least one proton-carrying group, and $n_1$ is the number of repeats of the repeating unit between round brackets, $R^1$, $R^2$ and Z being such as defined above;

b) a step to place the particles comprising a material able to catalyse oxygen reduction or hydrogen oxidation in contact with the polymer obtained at a), after which particles are obtained grafted with grafts of following formula (III):

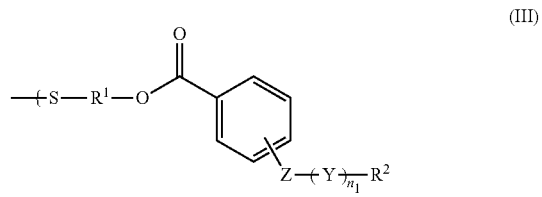

(III)

the brace indicating the point via which the grafts are covalently bonded to the particles, and $R^1$, $R^2$, Z, Y and $n_1$ being such as defined above.

In particular the $R^1$ groups may be the same as each other, similarly the Z groups may be the same as each other and the $R^2$ groups may be the same as each other.

Before entering into the present description in more detail, the following definitions are specified.

By polymer in the meaning of the invention is conventionally meant a compound composed of a sequence of one or more repeating units.

By repeating unit, according to the invention and as is conventional, is meant a bivalent organic group (i.e. a bridge-forming group) derived from a monomer after polymerisation thereof.

By polymerisation of ATRP type is meant radical polymerisation via atom transfer (ATRP standing for Atom Transfer Radical Polymerisation). The mechanism of this type of polymerisation is explained in more detail below.

When implementing the method of the invention it is therefore possible to obtain particles comprising a material able to catalyse oxygen reduction or hydrogen oxidation that are covalently bonded via a radical of the ATRP initiating compound by proton-conducting styrene polymers, thereby ensuring—when these particles are intended to be included in the composition of electrodes (in particular at the catalytic layers thereof)—good physical continuity with the adjacent electrolyte when the latter also contains one or more proton-conducting polymers.

In addition, by means of the specific choice of ATRP initiator, it has been possible to obtain particles imparting improved properties to the cells in which they are incorporated.

As mentioned below, the method of the invention comprises a step a) to prepare at least one styrene polymer via ATRP polymerisation of a styrene monomer with an ATRP initiator of above-mentioned formula (I).

This preparation step is governed by the mechanisms of ATRP polymerisation, which operates along the principle of rapid, reversible formation of so-called «dormant species» through the creation of a covalent bond with a reactive radical species.

The initiating compound of ATRP-type polymerisation and of formula (I) is a compound comprising at least one group capable of initiating ATRP polymerisation i.e. a group capable of cleaving at a bond to form a first radical species and a second radical species, the first radical species subsequently reacting with a first carbon carrying a double bond belonging to the monomer, the second radical species attaching itself to a second atom opposite the first carbon carrying the double bond.

In other words, this mechanism can be summarised by the following reaction scheme:

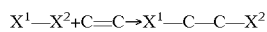

$X^1$-$X^2$ corresponding to the above-mentioned initiator with $X^1$ corresponding to the first species and $X^2$ corresponding to the second species, the species $X^1$—C—C—$X^2$ being a dormant species that can grow through successive additions of monomers on free radicals, as in conventional radical polymerisation, the free radicals being created starting from group $X^2$ which attaches itself, after insertion of the monomer, at the end of the polymeric chain which always forms a dormant species that is able to grow provided that monomers still subsist in the polymerisation medium.

For reasons of simplicity, only the double bond of the monomer is represented above.

In addition, the initiating compound of formula (I) used at this preparation step comprises at least one group able to be grafted onto the surface of the above-mentioned particles i.e. a group capable of reacting with the surface of said particles to form a covalent bond, after which there subsists a radical of this initiator covalently bonded onto the surface of said particles.

For the initiating compounds of formula (I), the group able to initiate polymerisation of ATRP type is the above-mentioned group-Z—$R^2$, this group being capable of homolytic cleavage at the carbon-halogen bond to form two radical species, a first carbon radical species (that can be symbolised by —C) and a second radical species composed of a halogen radical (that can be symbolized by $R_2$), the first species reacting with one end of the double bond of the monomer, and the second species reacting with the opposite end of the double bond. In formula (I), this group —Z—$R^2$ is represented as intersecting a carbon-carbon bond of the phenyl group, this indicating that it can be bonded to any of the carbon atoms of this phenyl group.

The group able to be grafted onto the surface of the particles, for this type of compound, corresponds to the disulfide group-S—S—.

For the compounds of formula (I), the $R^1$ groups and Z groups can each independently represent an alkylene group e.g. an ethylene group, a methylene group.

More specifically, the $R^1$ groups can be an ethylene group and the Z groups can be a methylene group.

When the Z groups represent a single bond, this means in other words that $R^2$ is directly bonded to any of the carbon atoms of the phenyl group.

For the compounds of formula (I), the —Z—$R^2$ groups can lie at para position relative to the —COO— groups.

One particular ATRP-initiating compound entering into the category of formula (I) compounds is a compound of following formula (IV):

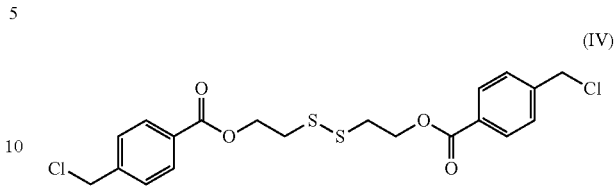

The formula (I) compounds can be synthesised via a nucleophilic substitution reaction between an acyl halide compound and an alcohol compound, this reaction being based on the formation of an alcoholate from deprotonation of the alcohol compound in a basic medium (e.g. in the presence of triethylamine), the alcoholate thus formed reacting on the acyl chloride to form the initiating compound, generally at a temperature in the region of 0° C., to ensure stability of the alcoholate.

For example, for the preparation of a compound of above-mentioned formula (IV), the acylation reaction can take place between the 2-hydroxyethyldisulfide compound and the 4-chloromethylbenzoyl chloride compound as per the following reaction scheme:

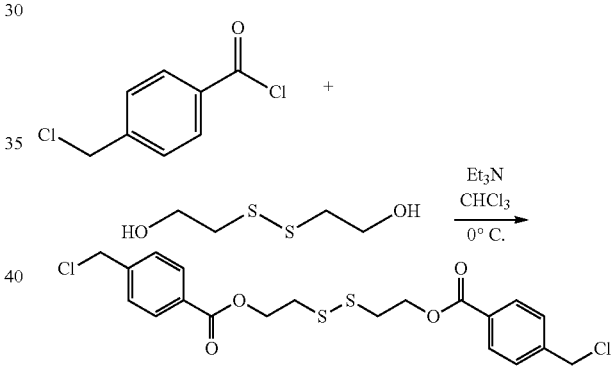

this reaction possibly being conducted with chloroform as organic solvent.

The monomers able to be used for the polymerisation step are styrene monomers and more specifically they can be monomers meeting following formula (V):

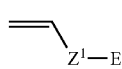

where:

$Z^1$ corresponds to a phenylene group; and

E corresponds to proton-conducting group, optionally in the form of a salt such as a sulfonic acid group, a phosphonic acid group or carboxylic acid group.

One specific monomer meeting the definition given above is a styrenesulfonic acid monomer e.g. in salt form such as a sodium salt (in which case the term sodium styrenesulfonate monomer can be used).

One example of this type of monomer is a monomer of following formula (VI):

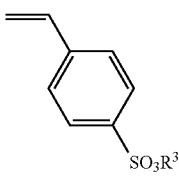
(VI)

where $R^3$ is a hydrogen atom or a cation (e.g. an alkali metal cation).

In addition to the presence of one or more monomers such as defined above, the polymerisation step conventionally takes place in the presence of a metal salt (e.g. a metal halide such as a copper halide e.g. copper chloride) and an organic ligand.

It is specified that by organic ligand it is meant an organic compound comprising at least one free doublet capable of filling an electron hole of a metal element (here, in our case, an electron hole on the metal element of the above-mentioned salt) to form a metal complex.

For example, one suitable organic ligand can be a compound belonging to the family of pyridine compounds such as bipyridine.

The polymerisation step can also be conducted in a water/organic solvent mixture (e.g. an alcohol solvent) under a stream of an inert gas (such as a stream of argon) at a suitable temperature and for a suitable time to generate polymerisation.

In addition, this polymerisation step can be followed by a hydrolysis step intended to protonate the proton-conducting groups when they are in salt form (i.e. in other words, this step consists of replacing the cations of the salt by hydrogen atoms).

The average molar masses of the polymers obtained after the polymerisation step can range from 1000 to 1 000 000 g/mol, preferably from 3000 to 500 000 g/mol, and more specifically from 3000 to 200 000 g/mol.

After step a), the method of the invention comprises a step b) to place the particles comprising a material able to catalyse oxygen reduction or hydrogen oxidation in contact with the polymer obtained at a), after which particles are obtained grafted with grafts of following formula (III):

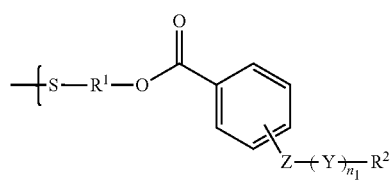
(III)

the group —$Z$—$(Y)_{n1}$—$R^2$, which intersects a carbon-carbon bond of the phenyl group, indicating that it can be bonded to any of the carbon atoms of the phenyl group.

This contacting step a) may comprise an operation to disperse the above-mentioned particles e.g. in an electrophilic solvent (such as an amine solvent e.g. hexylamine) followed by an operation to place the dispersion obtained in contact with one or more polymers such as defined above under sufficient conditions to allow covalent grafting of the polymers prepared at a).

The particles comprising a material able to catalyse oxygen reduction or hydrogen oxidation can be metal particles, namely particles comprising one or more metal elements (in which case, if there are several metal elements, the term particles in metal alloy(s) could be used).

Particularly suitable metal particles can be particles comprising a noble metal such as platinum, ruthenium, palladium and mixtures thereof.

If the particles obtained with the invention are intended to be used in PEMFC cells, the metal particles are advantageously platinum particles.

Without being bound by any theory, the polymer in the presence of particles will cleave into two organic residues via homolytic cleavage of the bond between the two sulfur atoms, the two residues consisting of radical species, the free electrons being positioned at the sulfur atoms, these free electrons each associating themselves with an electron present on the surface of the particles to form a covalent bond between the above-mentioned residues and the particles via the sulfur atoms, the resulting product possibly being schematised as follows:

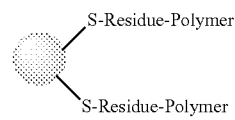

the solid sphere corresponding to a particle, —S-Residue corresponding to a residue of the ATRP-initiating compound forming a bridge between the particle and the polymer (respectively a first polymeric chain and a second polymeric chain).

With regard to the polymer, the proton-conducting group can be a sulfonic acid group —$SO_3H$, a carboxylic acid group —$CO_2H$ or a phosphonic acid group —$PO_3H_2$, these groups optionally being present in the form of salts.

Prior to step a) and/or b), the method of the invention may also comprise a step to prepare said above-mentioned particles, namely particles comprising a material able to catalyse hydrogen oxidation or oxygen reduction.

If the particles are metal particles, the preparation thereof may entail reducing a metal salt by causing it to react with a reducing agent.

For example, when the metal particles are platinum particles, they can be prepared by reducing a platinum salt with a reducing agent.

The platinum salt may be a halide salt of platinum, optionally hydrated, such as $H_2PtCl_6 \cdot 6H_2O$.

The reducing agent can be a metal hydride, and more particularly a metal borohydride such as sodium borohydride ($NaBH_4$).

The preparation can be conducted in a medium of «oil-in-water» emulsion type (the oil possibly corresponding to a hydrocarbon compound such as hexane).

From a practical viewpoint, the preparation of platinum particles in said medium can be carried out by implementing the following operations:

an operation to place a platinum salt (e.g. $H_2PtCl_6$—$H_2O$) previously dissolved in water in contact with a medium comprising an oil and optionally a dispersing agent (e.g. tetraethylene glycol monododecyl ether);

an operation to add a reducing agent to the mixture resulting from the preceding operation, in one or more times, after which the resulting mixture is left under agitation for sufficient time until ceasing of all gas release (this ceasing being an indication that reduction is complete).

The final mixture therefore comprises platinum particles, this mixture able to be used as such to implement step a) (it could thus be said that step a) is performed in situ).

As a variant, the final mixture can be treated (e.g. via filtration) to isolate the platinum particles obtained, the latter being intended to be used to implement step a).

Aside from the fact that the particles obtained with the method of the invention are functionalised by polymers comprising at least one repeating unit carrying at least one proton-conducting group or a precursor thereof, these particles can also be bound (e.g. also covalently) to a carbon material (possibly being considered a carbon substrate) such as graphite, carbon black, carbon fibres, carbon tubes (such as carbon nanotubes), graphene.

If the particles are bound to a carbon material, it can be employed at different times when implementing the method of the invention.

According to a first embodiment, the particles can be used already bound to a carbon material when implementing step b).

These particles already bound to a carbon material can be prepared prior to implementation of step b).

In this case, the method of the invention, before implementing step b), may comprise a step to prepare particles comprising a material able to catalyse oxygen reduction or hydrogen oxidation by binding them to a carbon material.

In a first variant, when the particles are metal particles, the preparation therefore may comprise:
  an operation to reduce a metal salt by causing the latter to react with a reducing agent, after which metal particles are obtained;
  an operation to place the medium resulting from the preceding operation in contact with the carbon material intended to be bound to the particles, after which metal particles bound to a carbon material are obtained.

For example, when the metal particles are platinum particles, the reduction step consists in reducing a platinum salt with a reducing agent.

The platinum salt can be a platinum halide salt, optionally hydrated, such as $H_2PtCl_6.6H_2O$.

The reducing agent can be a metal hydride, and more particularly a metal borohydride such as sodium borohydride ($NaBH_4$).

The preparation can be conducted in medium of «oil-in-water» emulsion type, the oil possibly corresponding to a hydrocarbon compound such as hexane.

From a practical viewpoint, the preparation of platinum particles in said medium, before contacting with the carbon material, can be performed by implementing the following operations:
  an operation to place a platinum salt (e.g. $H_2PtCl_6$—$H_2O$), previously dissolved in water, in contact with a medium comprising an oil and optionally a dispersing agent;
  an operation to add a reducing agent to the mixture resulting from the preceding operation, after which the resulting mixture is left under agitation for sufficient time until ceasing of all gas release (this ceasing being an indication that the reduction reaction is completed), after which a mixture comprising platinum particles is obtained.

This mixture comprising platinum particles is then placed in contact with the carbon material, preferably under ultrasound, leading to a final mixture after this contacting operation that comprises platinum particles bound to the carbon material; said mixture can be used as such to implement step b).

As a variant, this final mixture can be treated (e.g. by filtration) to isolate the platinum particles obtained, these intended to be used to implement step b).

In a second variant, if the particles are metal particles, the preparation may entail a reduction step using a reducing agent to reduce a mixture comprising a metal salt and a carbon material, by causing the latter to react with a reducing agent, after which metal particles bound to the carbon material are obtained.

For example, if the metal particles are platinum particles, the reduction step consists in reducing a platinum salt with a reducing agent.

The platinum salt can be a platinum halide salt, optionally hydrated, such as $H_2PtCl_6.6H_2O$.

The reducing agent can be a metal hydride and more particularly a metal borohydride such as sodium borohydride ($NaBH_4$).

Still further specifically, the preparation of platinum particles bound to a carbon material can be conducted by implementing the following operations:
  an operation to place a basic aqueous solution (e.g. containing lithium carbonate) of a platinum salt (e.g. $H_2PtCl_6$—$H_2O$) in contact with the carbon material;
  an operation to add a reducing agent to the mixture resulting from the preceding operation, after which the resulting mixture is left under agitation for sufficient time until a mixture is obtained comprising platinum particles bound to the carbon material.

This mixture can be treated (e.g. by filtration) to isolate the platinum particles obtained, these intended to be used to implement step b).

In a second embodiment, the particles can be used, when implementing step b), in a form not bound to the carbon material which, in this case, means that the method of the invention after step b) comprises a step to place the particles obtained after step b) in contact with the carbon material (hereafter called step b'), the particles after this step being bound to the carbon material.

More specifically, this contacting step with the carbon material can be conducted under ultrasound to activate collision of the particles with the carbon material to form a bond between these particles and the material.

For the first embodiment (i.e. the embodiment in which the particles used are already bound to a carbon material before implementing step b)), step b) can be performed with the following operations:
  an operation to disperse the particles in an electrophilic organic solvent such as an amine solvent (e.g. hexylamine), this type of solvent contributing towards ensuring good stabilisation of the dispersion, after which a dispersion of particles is obtained bound to a carbon material and comprising a material able to catalyse hydrogen oxidation or oxygen reduction;
  an operation to place the above-mentioned dispersion in contact with a polymer such as defined above, preferably previously dissolved in water;
  optionally, an operation to wash the particles obtained e.g. with cycles of precipitation/centrifugation to remove traces of non-reacted initiator compound.

For the second embodiment (i.e. the embodiment in which the method of the invention after step b) comprises a step to place the particles obtained after step b) in contact with the carbon material (hereafter called step b'), after which said particles are bound to the carbon material), the method of the invention may comprise:

a step to prepare particles comprising a material able to catalyse hydrogen oxidation or oxygen reduction;

a step b), such as defined above, to place a polymer such as defined above in contact with the particles previously obtained, in the synthesis medium of the preceding step;

a step to place the particles resulting from step b) in contact with a carbon material, to obtain particles bound to a carbon material.

If the particles are metal particles, the preparation step thereof may comprise a reduction operation of a metal salt by causing the latter to react with a reducing agent, after which metal particles are obtained.

For example, if the metal particles are platinum particles, the reduction step consists in reducing a platinum salt with a reducing agent.

The platinum salt may be a platinum halide salt, optionally hydrated, such as $H_2PtCl_6.6H_2O$.

The reducing agent can be a metal hydride, and more particularly a metal borohydride such as sodium borohydride ($NaBH_4$).

The preparation can be performed in a medium of «oil-in-water» emulsion type, the oil possibly corresponding to a hydrocarbon compound such as hexane.

From a practical viewpoint, the preparation or platinum particles in said medium, before contacting with the initiating compound and then the carbon material, can be conducted by implementing the following operations:

an operation to place a platinum salt (e.g. $H_2PtCl_6$—$H_2O$) previously dissolved in water in contact with a medium comprising an oil and optionally a dispersing agent;

an operation to add a reducing agent to the mixture resulting from the preceding operation, after which the resulting mixture is left under agitation for sufficient time until ceasing of all gas release (this ceasing being an indication that the reaction is complete), after which a mixture is obtained comprising platinum particles.

The contacting step b) can be conducted by placing the polymer in an aqueous medium so as not to perturb the synthesis medium of the particles.

The contacting step with the carbon material can be performed by placing the latter directly in the synthesis medium and subjecting the resulting mixture to ultrasound treatment, to generate binding of the carbon material to the particles.

This embodiment allows one-pot synthesis of particles bound to a carbon material and grafted onto polymers such as defined above via residues of initiating compound of ATRP polymerization.

In a third embodiment, the method of the invention comprises a step to prepare particles in a material able to catalyse oxygen reduction or hydrogen oxidation and bound to a carbon material, this step being performed concomitantly with step b).

In this case, if the particles are metal particles, the preparation thereof conducted concomitantly with step b) comprises:

a step to place a metal salt, a carbon material in a basic medium in contact with a polymer such as defined above at step a);

a step to add a reducing agent to the mixture resulting from the preceding step, after which particles conforming to the invention are obtained namely metal particles bound to a carbon material and to polymers such as defined above;

optionally a step to isolate the particles thus obtained.

For example, when the particles are platinum particles, the preparation thereof conducted concomitantly with step b) comprises:

a step to place a platinum salt (e.g. $H_2PtCl_6$—$H_2O$), a carbon material (such as carbon black) in contact with a basic aqueous solution (e.g. containing lithium carbonate) and with a polymer such as defined for step a);

a step to add a reducing agent to the mixture resulting from the preceding step, after which the resulting mixture is left under agitation for sufficient time until a final mixture is obtained comprising platinum particles bound to the carbon material and to the above-mentioned polymer.

In this third embodiment, fully unexpectedly, the presence of the polymer right from the start does not modify the reactivity of the metal salt or the mechanism of particle formation, this being particularly advantageous since it can therefore be envisaged to produce said particles using a so-called «one pot» method.

Irrespective of the embodiment followed, the graft rate of polymer(s) (expressed as a weight percentage of polymer in the particles) can range from 1 to 25 weight %.

The particles that can be obtained with the method of the invention are particles comprising a material able to catalyse oxygen reduction or hydrogen oxidation, such as platinum, said particles being grafted with grafts of following formula (III):

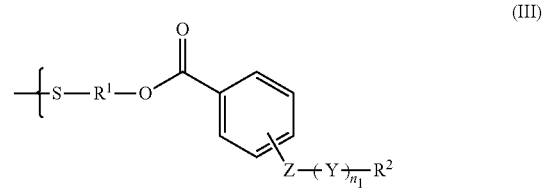

(III)

where $R^1$, $R^2$, Z, Y and $n_1$ meet the same definitions as those given above, the group —Z—$(Y)_{n_1}$—$R^2$ which intersects a carbon-carbon bond of the phenyl group indicating that it can be bound to any of the carbon atoms of the phenyl group.

More specifically, $R^1$ and Z are an alkylene group and $R^2$ a halogen atom such as chlorine, whilst Y can represent a repeating unit resulting from the polymerisation of a styrene monomer of above-mentioned formula (IV) or (IV'), such as a sodium styrenesulfonate monomer. The —Z—$(Y)_{n_1}$—$R^2$ group can also be at para position relative to the —CO—O— group.

For information, the brace indicates the point at which the grafts are covalently bonded to the particles.

In particular, the particles can be platinum particles.

Specific particles conforming to the invention can be platinum particles grafted with grafts of following formula (VII):

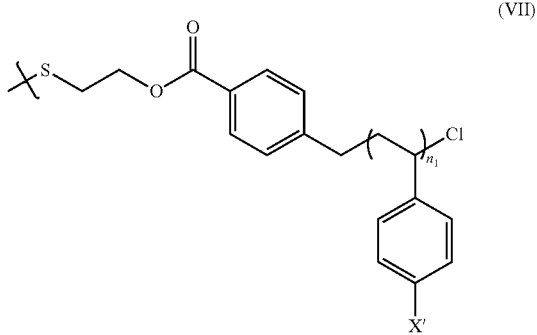

(VII)

with $n_1$ being such as defined above and X' being a sulfonic acid group —$SO_3H$, a carboxylic acid group —$CO_2H$ or a phosphonic acid group —$PO_3H_2$, these groups optionally being present in salt form.

In addition, the particles can be covalently bound to a carbon material.

Said particles are of particular interest since they allow transposition of the triple point phenomenology onto molecular scale, the role of the catalyst being met by the constituent material of the particle as such, the role of the proton conductor being met by the above-mentioned polymers, and the role of the electronic conductor being met by the carbon material. The covalent bonds between the electronic conductor and catalyst and between the proton-conducting material and catalyst first ensure better charge transfer (of electrons and protons respectively) and hence better performance and secondly perfect stability under cell operating conditions, when these particles are used in cells. These two results allow a reduction in the level of catalyst content for increased performance.

As already mentioned with respect to the method, the particles comprising a material able to catalyse oxygen reduction or hydrogen oxidation can be metal particles, namely particles comprising one or more metal elements (in which case, if there are several metal elements, the term particles in metal alloy(s) could be used).

Metal particles that are particularly suitable can be particles comprising a noble metal such as platinum, ruthenium, palladium and mixtures thereof.

If the particles obtained with the invention are intended to be used in PEMFC cells, the metal particles are advantageously platinum particles.

Regarding the carbon material, if present, this may be graphite, carbon black, carbon fibres, carbon tubes (e.g. carbon nanotubes), graphene.

The ratio between the carbon material and platinum can be between 80:20 and 20:80, ideally between 45:55 and 65:35.

The particles of the invention can enter into the composition of fuel cell electrodes, in particular fuel cells of PEMFC type, more particularly in catalytic layers of fuel cell electrodes.

The invention therefore also relates to electrodes comprising said particles and to fuel cells comprising at least one electrode-membrane-electrode assembly in which at least one of the electrodes is an electrode conforming to the invention.

These particles show no sign of degradation below 220° C. (this limit being determined by TGA). In addition, the electrochemical resistance of the organic ring (formed by the polymers grafted to the particles) was demonstrated over a potential range of 0 to 1.2 V vs. RHE (Reversible Hydrogen Electrode), allowing the envisaged use of these particles as catalysts for fuel cells of PEMFC type.

These particles are dispersible in an alcohol solution. It is therefore possible to mix these with a proton-conducting ionomer in proportions ranging from 100:0 to 70:30. The solution can then be deposited on any type of porous carbon substrate (fabric or felt) and used as fuel cell electrode.

Furthermore, the particles of the invention, once incorporated in fuel cells, allow improved properties to be obtained, such as open-circuit voltage, better activation of electrochemical reactions within the cell, lesser ohmic drop and improved delivered power, compared with similar batteries in which the added particles are nonetheless particles grafted with grafts of formula (I').

In addition, these particles exhibit electrocatalytic activity even when they are used without an ionomer of a sulfonated tetrafluroethyelene based fluroropolymer-copolymer, such as the type sold under the trademark NAFION®. This particularly remarkable result allows NAFION®-free electrodes to be produced. Associated with alternative membranes to NAFION®, these particles can be used to produce membrane/electrode assemblies free of any NAFION®.

Therefore, fuel cells e.g. of PEMFC type conventionally comprising at least one electrode-membrane-electrode assembly can have at least one of the electrodes containing particles in conformity to the invention.

The membrane can be in a proton-conducting polymeric material, the constituent polymer(s) of this material possibly being of same type as the polymer(s) grafted onto the surface of said particles.

The polymers used to graft the particles of the invention are novel and meet following formula (II):

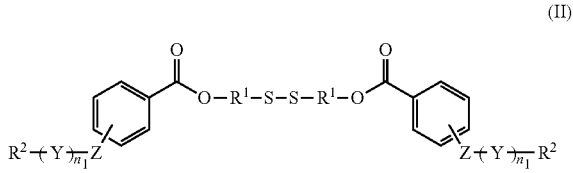

(II)

where $R^1$, $R^2$, Z, Y and $n_1$ meet the same definitions as those given above.

The indications given above for the definitions of $R^1$, Z, Y, $R^2$ can be applied to the definition of the polymers of the invention.

In particular, the groups $R^1$, Z can be alkylene groups such as an ethylene group, methylene group.

The —Z—$(Y)_{n1}$—$R^2$ groups can be bound to any of the carbon atoms of the phenyl group, and in particular they can be positioned at para position relative to the —CO—O— group.

One specific polymer conforming to the invention is a polymer of following formula (VII):

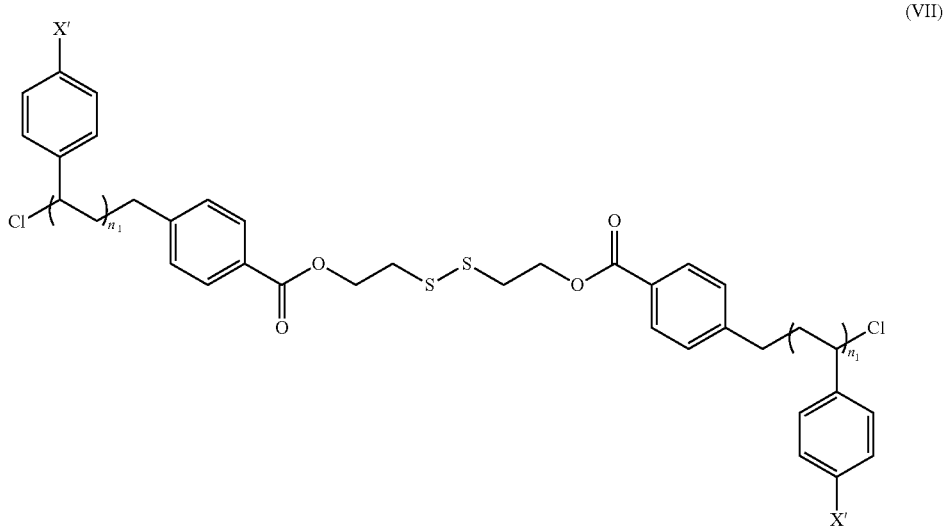

where $n_1$ corresponds to the definition given in claim 1 and X' is a sulfonic acid group —SO$_3$H, carboxylic acid group —CO$_2$H or phosphonic acid group —PO$_3$H$_2$, these groups optionally being present in salt form.

The initiators used in the method of the invention are also novel and meet following formula (I):

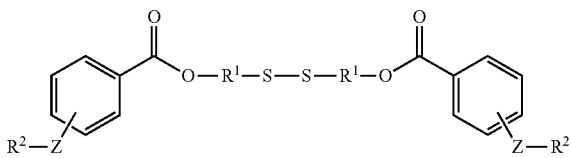

where:

R$^1$ is an organic spacer group;

Z is a single bond or organic spacer group;

R$^2$ is a halogen atom.

The indications given above for the definitions R$^1$, Z, and R$^2$ can be applied to define the initiators of the invention.

In particular, the groups R$^1$, Z can be alkylene groups such as an ethylene group, a methylene group.

More specifically, the R$^1$ groups can be an ethylene group and Z groups can be a methylene group.

The —Z—R$^2$ groups can be bound to any of the carbon atoms of the phenyl group and, in particular, they can be positioned at para position relative to the —CO—O— group.

One specific ATRP initiator conforming to the invention meets following formula (VI):

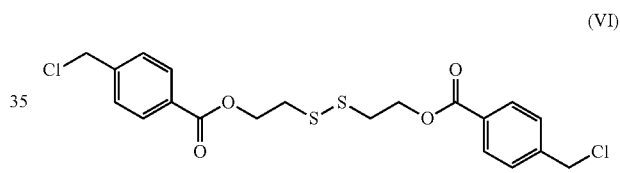

The invention will now be described with reference to the following examples given for illustration purposes and non-limiting.

BRIEF DESCRIPTION OF THE SINGLE FIGURE

The single FIGURE is a voltammogram illustrating the trend in intensity I (in μA) as a function of the potential E (in V) vs. RHE obtained with a device comprising an electrode conforming to the invention such as defined in Example 4.

DETAILED DESCRIPTION OF PARTICULAR EMBODIMENTS

Example 1

This example illustrates the preparation of an ATRP initiator conforming to the invention: disulfanediyldiethane-2,1-diyl bis[4-(chloromethyl)benzoate] of following formula (VI):

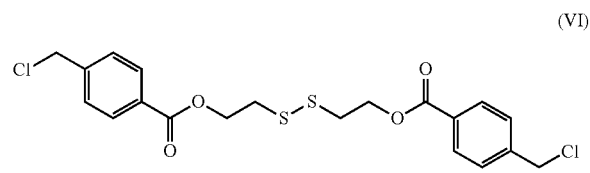 [SMILES: O=C(OCCSSCCOC(=O)c1ccc(CCl)cc1)c1ccc(CCl)cc1]

For this preparation, a 100 mL two-neck flask is charged under an inert atmosphere with 2-hydroxyethyldisulfide (1.53 g; 9.9 mmol; 1 eq.), chloroform (30 mL) and triethylamine (4.22 g; 41.7 mmol; 4.2 eq.). The two-neck flask is sealed under argon then immersed in an ice bath at 0° C.

4-chloromethylbenzoyl chloride (2.06 g; 10.9 mmol; 1.1 eq.) is added dropwise. The mixture is left to return to ambient temperature overnight. The resulting reaction mixture is washed 4 times (one acid wash, one neutral wash, one basic wash followed by a neutral wash). The organic phases are combined and dried. The organic solvent is removed using a rotary evaporator. The solid product obtained is then dried overnight in an oven at 60° C.

The resulting product (with a yield of 97%) corresponded to the expected product having the above formula as shown by $^1$H NMR analyses and elementary analysis, the results of which are given below.

$^1$H NMR (400 MHz, CDCl$_3$, δ=7.26 ppm): 7.9 (m, 2H, H$_{aromatic}$), 7.4 (m, 2H, H$_{aromatic}$), 4.5 (m, 4H, Ph-$\underline{CH}_2$—Cl and O—$\underline{CH}_2$—CH$_2$), 3.0 (t, 2H, O—CH$_2$—$\underline{CH}_2$—S).

Elementary analysis (in %): (C$_{20}$H$_{20}$Cl$_2$O$_4$S$_2$), C: 52.1; H: 4.4; Cl: 15.5; O: 14; S: 14.

Example 2

This example illustrates the preparation of a polymer able to be schematised by the following formula below:

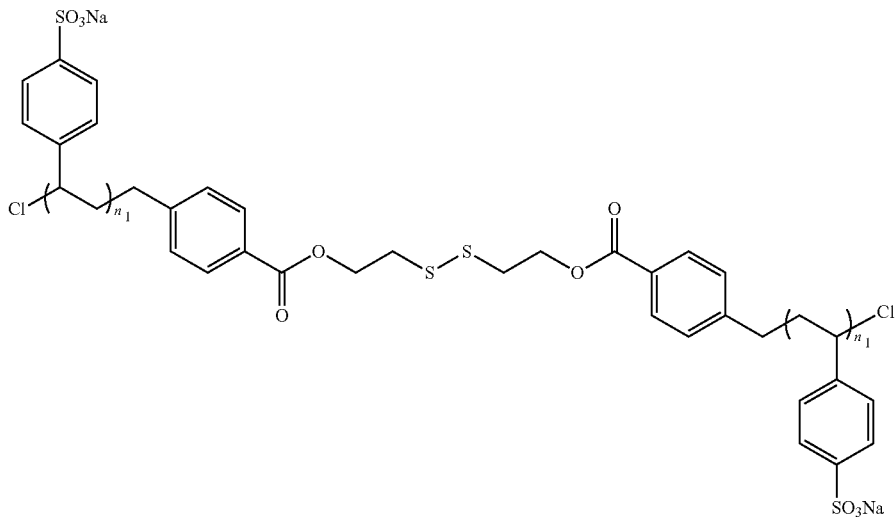

with n$_1$ corresponding to the number of repeats of the unit between brackets.

For this preparation, first a 100 mL two-neck flask is subjected to vacuum heat treatment comprising 3 cycles with a heating phase and a cooling phase to ambient temperature.

Ultrapure water sold under the trademark MILLIQ® (48 mL) is placed in the two-neck flask and vacuum degassed by bubbling argon (15 minutes). Sodium styrenesulfonate (18.8 g; 90 mmol; 1000 eq.) is then added under a stream of argon and vacuum degasification continued with argon.

In parallel, methanol (16 mL) is vacuum degassed by bubbling argon (15 minutes) in a 25 mL conical flask. The initiator prepared in Example 1 (50 mg; 0.09 mmol; 1 eq.) is then added under argon.

When the monomer is fully dissolved in water, bipyridine (116 mg; 0.74 mmol; 8 eq.) and copper chloride (37 mg; 0.37 mmol; 4 eq.) are added under a stream of argon.

Argon is bubbled through the system whilst applying a vacuum.

The initiator solution in methanol is added using a syringe (20 mL) taking care that it is conditioned under argon. Finally, three vacuum-argon cycles are performed.

The two-neck flask is placed in an oil bath previously heated to 45° C. After a polymerisation time of about 21 hours, the reaction is halted by placing the system in air. The solution changes from a brown colour to a green-blue colour.

The reaction mixture is filtered over silica gel to remove the chloride ions contained in the catalytic system and trapped in the polymer.

The filtrate is concentrated in vacuo to increase the polymer concentration and hence facilitate precipitation.

Finally, the polymer is precipitated in cold methanol.

The polymer obtained is a tacky, whitish solid and is placed in an oven overnight at 65° C.

The resulting polymer corresponded to the expected product of the above formula as shown by $^1$H NMR analyses, the results of which are given below.

$^1$H NMR (D$_2$O) δ: 7.5 (broad s, aromatic proton), 6.6 broad s, aromatic proton), 1.4 (broad s, methyl proton).

Example 3

This example illustrates the preparation of platinum particles bound to a carbon material of carbon black type (called "VULCAN® XC72" in the formula below), represented by the following formula:

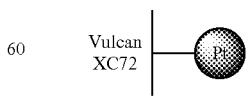

with a method involving a so-called "water-in-oil" emulsion.

Heptane (37.4 g) and a polyoxyethylene (4) Lauryl Ether sold under the trademark BRIJ® 30 (8.6 g) are poured into a reactor. Immediately, the reactor is vigorously and manually agitated to prevent the precipitation of BRIJ® 30, until the mixture is fully translucent.

In parallel, a hexahydrate platinum salt $H_2PtCl_6.6H_2O$ (257.6 mg; 0.5 mmol, 1 eq.) is dissolved in 2 mL of ultrapure water sold under the trademark MILLIQ® in a pill bottle. The solution is strongly agitated until it is fully homogeneous.

1.6 mL of the metal salt solution are added to the above-mentioned reactor and manually agitated until the mixture becomes limpid. This mixture is of orangish-yellow colour.

The resulting mixture is left to stand for a time of 15 minutes so that it stabilises.

Sodium borohydride (152 mg; 4 mmol; 15 eq.) is rapidly added to the mixture in a single time and the mixture immediately agitated vigorously (the sodium borohydride having to reduce the metal before the water). The mixture changes to an intense black colour.

The mixture is left to stand for 1 to 2 hours so that the platinum is fully reduced and the $NaBH_4$ fully deactivated.

After two hours, the mixture is placed under ultrasound for 5 minutes, with agitation from time to time, so that there is no longer any deposit at the bottom of the reactor.

VULCAN®XC 72 carbon black (previously finely ground) is added to the mixture whilst it is still subjected to ultrasound which is continued for 5 minutes after this addition, maintaining sporadic agitation. After 5 minutes, the reactor is strongly agitated manually and, after verifying that the carbon black does not deposit at the bottom of the reactor, it is again subjected to ultrasound for 5 minutes before being manually agitated a further time. These operations are repeated until the carbon no longer deposits at the bottom of the reactor.

Once the carbon black is well suspended, the reactor is left in the ultrasound bath. Acetone (1 volume of acetone per one volume of microemulsion) is added gradually, agitating manually with each addition phase. The resulting mixture is left for 5 to 10 minutes in the ultrasound bath after the addition is completed.

The particles are isolated by vacuum ultrafiltration on a hydrophilic membrane in polyvinylidene fluoride (PVDF), sold under the trademark DURAPORE® (0.22 µm; GVWP 04700). The platinum particles supported on the carbon material (carbon black) are washed by filtration with cycles of 4*30 mL acetone, 3*30 mL ethanol and 4*30 mL of ultrapure water sold under the trademark MILLIQ® (with agitation between each wash). The particles obtained are placed for 2 hours in an oven at a temperature of 135° C., to remove the last traces of BRIJ® 30.

The yield is quantitative.

The particles obtained were analysed by elementary analysis confirming the presence of carbon (60%) and platinum (40%), indicating that the platinum particles were supported on the carbon material.

Example 4

This example illustrates the preparation of platinum particles prepared according to Example 3 and grafted with the polymer prepared in Example 2, these particles therefore being grafted with grafts of the following formula:

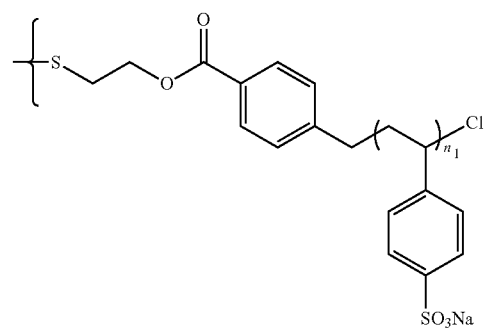

$n_1$ indicating the number of repeats of the repeating unit between round brackets.

For this preparation, the particles prepared in Example 3 are placed in a 25 mL round-bottom flask with hexylamine. The flask is placed in an ultrasound bath for 15 minutes to obtain a homogeneous suspension of particles. The polymer obtained in Example 2 is placed in solution in a water/hexylamine mixture (50:50 by volume) and then added to the flask. The whole is placed under magnetic stirring for 12 hours.

The functionalised platinum particles are precipitated in acetone and subjected to different wash steps (3*30 mL acetone, 3*30 mL ethanol and 3*30 mL water).

These wash steps allow the removal of traces of any polymers that were not grafted onto the particles.

The particles are placed in an oven overnight at 65° C.

Example 5

In this example, the particles obtained in Example 4 are subjected to different analyses to analyse:
electrochemical characterization of these particles; and
in-cell testing of the particles.

c) Electrochemical Characterization of the Particles

Characterization of the resistance of the organic ring was performed in a supporting medium (argon) with a cell having three electrodes. In this cell, the reference electrode was a reversible hydrogen electrode (RHE) having a fixed, known electrochemical potential. The second electrode was an auxiliary electrode called counter-electrode (CE) composed of an inert material, in our case a plate of glassy carbon used for current collection. The third electrode was a working electrode (WE) on which the catalyst was examined. A gas input/output system (GI/GO) was added to operate under a controlled atmosphere. Measurements were taken by cycling the electrode potential between 0.05 V vs. RHE and an upper potential limit of successively 1 V vs. RHE (potential positioned after the start of the oxidation reaction on the platinum surface and corresponding to the potential of the cathode of a PEMFC at open-circuit), 1.1 and 1.2 V vs. RHE (strongly oxidizing potential), the results being given in the voltammogram in the single FIGURE.

On successive scans passing through electrode potentials higher than 1.0 V vs. RHE, the recorded currents were stable and characteristic of a modified platinum surface, confirming the presence after several cycles of the organic ring.

By way of comparison, for particles grafted with grafts of formula (I') such as defined above, these exhibited instability after 1 V vs. RHE.

Catalytic activity and selectivity are major properties when choosing a catalyst.

Characterization of the materials in an oxygen-saturated acid medium allowed study of their catalytic behaviour with regard to the oxygen reduction reaction. The trace of the voltammograms was equivalent to that obtained with catalysts of a powdered carbon black sold under the trademark VULCAN® XC72/Pt type. For all the characterized materials, the total number of exchanged electrons was 4 at between 0.7 and 0.4 V vs. RHE. Oxygen reduction was therefore complete for water formation.

d) In-Cell Testing

For this testing, cells were prepared comprising a NAFION® NR212 membrane and two gas diffusion electrodes (anode and cathode) respectively containing at the anode and cathode 0.4 mg/cm' of particles of the invention (Cell 1) and, for comparison, particles grafted with grafts of formula (I') such as defined above (Cell 2).

The gas diffusion electrodes were prepared simply by pouring a catalytic ink (comprising the particles in an ethanol/water mixture (3:1)) onto a fabric followed by evaporation at 50° C. for 4 hours.

The tests were conducted in a 5 cm² mono-cell under $H_2/O_2$ at a pressure of 3 bars, 60° C. and 21% humidity.

With Cell 1 of the invention, better open-circuit voltage (OCV) was obtained (1 V vs. 0.91 V for Cell 2), better activation at between 0 and 0.1 A/cm² (in other words, indicating faster set-up of redox reactions within the cell) as well as lesser ohmic drop.

Under these conditions, the maximum power delivered by Cell 1 is 250 mW/cm² compared with 140 mW/cm² for Cell 2, which corresponds to an improvement of 64%.

The invention claimed is:

1. ATRP initiator meeting following formula (I):

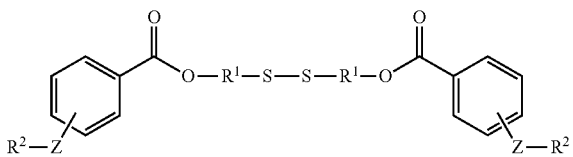

where:
the $R^1$ groups are each independently an organic spacer group;
the Z groups are each independently an alkylene group; and
the $R^2$ groups are each independently a halogen atom.

2. The ATRP initiator according to claim 1 meeting following formula (VI):

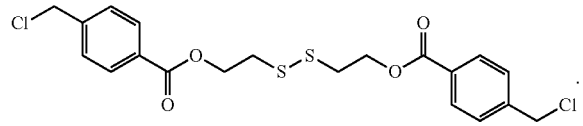

3. Method for preparing particles comprising a material able to catalyse oxygen reduction or hydrogen oxidation, said particles being grafted with grafts composed of at least one polymer comprising at least styrene repeating unit carrying at least one proton-conducting group, said method comprising:

a) a step to prepare at least one styrene polymer via ATRP polymerisation of a styrene monomer with an ATRP initiator meeting following formula (I):

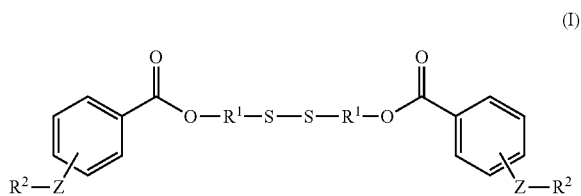

where:
the $R^1$ groups are each independently an organic spacer group;
the Z groups are each independently a single bond or an organic spacer group;
the $R^2$ groups are each independently a halogen atom;
the at least one styrene polymer meeting following formula (II):

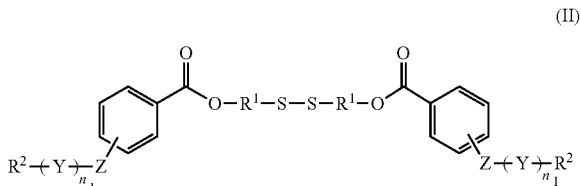

where Y corresponds to the styrene repeating unit carrying at least one proton-conducting group and $n_1$ to a number of repeats of the repeating unit between round brackets, $R^1$, $R^2$ and Z being such as defined above;

b) a step to place the particles comprising the material able to catalyse oxygen reduction or hydrogen oxidation in contact with the polymer obtained at a), after which particles are obtained grafted with grafts of following formula (III):

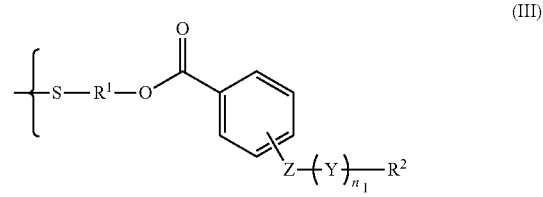

the brace indicating the point at which the grafts are covalently bonded to the particles, and $R^1$, $R^2$, Z, Y and $n_1$ being such as defined above.

4. The method according to claim 3, wherein $R^1$ and Z are each independently an alkylene group.

5. The method according to claim 3, wherein the —Z—$R^2$ groups are at para position relative to the —COO— groups.

6. The method according to claim 3, wherein the ATRP initiator is a compound of following formula (IV):

(IV)

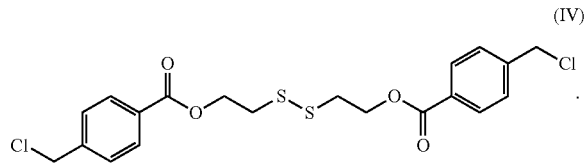 [SMILES: O=C(OCCSSCCOC(=O)c1ccc(CCl)cc1)c1ccc(CCl)cc1]

7. The method according to claim 3, wherein the proton-conducting group is a sulfonic acid group —SO$_3$H, carboxylic acid group —CO$_2$H or phosphonic acid group —PO$_3$H$_2$, these groups optionally being present in salt form.

8. The method according to claim 3, wherein the styrene monomer is a monomer of following formula (V):

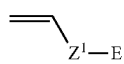

(V)

where:
Z$^1$ corresponds to a phenylene group; and
E corresponds to a proton-conducting group, optionally in salt form.

9. The method according to claim 3, wherein the styrene monomer is a sodium styrenesulfonate monomer.

10. The method according to claim 3, wherein the particles are platinum particles.

11. The method according to claim 3, wherein the particles are metal particles.

12. The method according to claim 11, wherein the metal particles are particles comprising a noble metal or mixture thereof.

13. The method according to claim 3, wherein the particles are additionally bound to a carbon material.

14. The method according to claim 13, wherein the carbon material is selected from among graphite, carbon black, carbon fibres, carbon tubes, graphene.

15. The method according to claim 13 also comprising before step a) and/or b), a step to prepare particles comprising the material able to catalyse oxygen reduction or hydrogen oxidation.

16. Polymer meeting following formula (II):

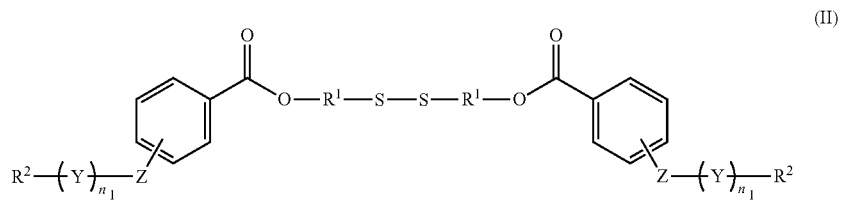

(II)

where R$^1$, R$^2$, Z, Y and n$_1$ meet the same definition as those given in claim 3.

17. The polymer according to claim 16, meeting following formula (VII):

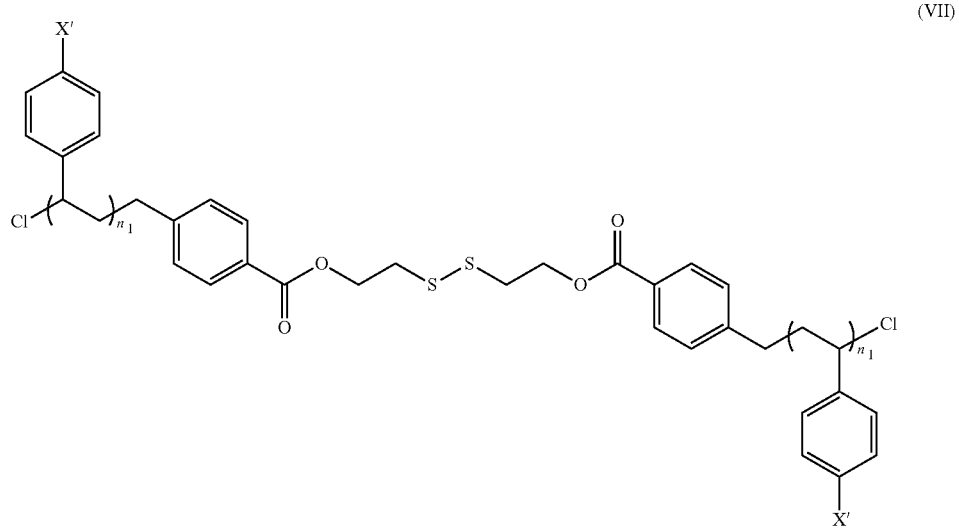

(VII)

where $n_1$ corresponds to the definition given in claim 16 and X' is a sulfonic acid group —$SO_3H$, a carboxylic acid group —$CO_2H$ or phosphonic acid group —$PO_3H_2$, these groups optionally being present in salt form.

18. Particles able to be obtained with a method according to claim 3, said particles comprising the material able to catalyse oxygen reduction or hydrogen oxidation, said particles being grafted with grafts of following formula (III):

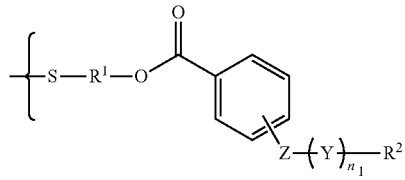

(III)

where $R^1$, $R^2$, Z, Y and $n_1$ meet the same definition as those given in claim 3.

19. The particles according to claim 18, wherein Y is a repeating unit resulting from the repeat of a sodium styrenesulfonate monomer.

20. The particles according to claim 18, that are platinum particles.

21. Electrode comprising particles such as defined in claim 18.

22. Fuel cell comprising at least one electrode-membrane-electrode assembly, wherein at least one of the electrodes is an electrode such as defined in claim 21.

* * * * *